US008612659B1

(12) United States Patent
Serebrin et al.

(10) Patent No.: US 8,612,659 B1
(45) Date of Patent: Dec. 17, 2013

(54) HARDWARE INTERRUPT ARBITRATION IN VIRTUALIZED COMPUTER SYSTEMS (75) Inventors: Benjamin C. Serebrin, Sunnyvale, CA (US); Raviprasad Mummidi, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 402 days.

(21) Appl. No.: 12/967,979

(22) Filed: Dec. 14, 2010

(51) Int. Cl.
*G06F 13/24* (2006.01)

(52) U.S. Cl.
USPC .............................. 710/262; 710/264; 718/1

(58) Field of Classification Search
USPC ........................................ 710/260–269; 718/1
See application file for complete search history.

(56) References Cited

U.S. PATENT DOCUMENTS

| | | | | | |
|---|---|---|---|---|---|
| 5,778,236 | A | * | 7/1998 | Gephardt et al. | 710/266 |
| 5,905,897 | A | | 5/1999 | Chou et al. | |
| 7,209,994 | B1 | * | 4/2007 | Klaiber et al. | 710/264 |
| 7,222,203 | B2 | * | 5/2007 | Madukkarumukumana et al. | 710/260 |
| 7,237,051 | B2 | * | 6/2007 | Bennett et al. | 710/260 |
| 7,552,236 | B2 | * | 6/2009 | Greenfield et al. | 709/238 |
| 7,590,982 | B1 | * | 9/2009 | Weissman | 718/1 |
| 7,849,327 | B2 | * | 12/2010 | Leung et al. | 713/189 |
| 8,032,680 | B2 | * | 10/2011 | Ganguly | 710/264 |
| 8,037,227 | B2 | * | 10/2011 | Weissman | 710/260 |
| 8,055,827 | B2 | * | 11/2011 | Serebrin et al. | 710/260 |
| 8,271,978 | B2 | * | 9/2012 | Bennett et al. | 718/1 |
| 8,286,162 | B2 | * | 10/2012 | Neiger et al. | 718/1 |
| 8,312,452 | B2 | * | 11/2012 | Neiger et al. | 718/1 |
| 2010/0223611 | A1 | | 9/2010 | Mahalingam et al. | |
| 2012/0331467 | A1 | * | 12/2012 | Neiger et al. | 718/1 |
| 2013/0174148 | A1 | * | 7/2013 | Amit et al. | 718/1 |

OTHER PUBLICATIONS

Nakajima, Jun. Enabling Optimized Interrupt/APIC Virtualization in KVM. Intel Open Source Technology Center. Nov. 8, 2012.*
Intel Corporation. Intel 64 and IA-32 Architectures Software Developers Manual. Jun. 2013.*
Advanced Micro Devices. AMD I/O Virtualization Technology (IOMMU) Specification License Agreement. Rev. 2.00. Mar. 24, 2011.*
U.S. Appl. No. 12/550,193, filed Aug. 28, 2009, titled "Thread Compensation for Microarchitectural Contention."
U.S. Appl. No. 12/687,999, filed Jan. 15, 2010, titled "Guest/Hypervisor Interrupt Coalescing for Storage Adapter Virtual Function in Guest Passthrough Mode."
"Intel 64 and IA-32 Architectures Software Developer's Manual," vol. 3A: System Programming Guide, Part I, Chapter 10, Sep. 2010.

* cited by examiner

*Primary Examiner* — Matthew D Spittle (57) ABSTRACT

Hardware interrupts are routed to one of multiple processors of a virtualized computer system based on priority values assigned to the codes being executed by the processors. Each processor dynamically updates a priority value associated with code being executed thereby, and when a hardware interrupt is generated, the hardware interrupt is routed to the processor that is executing a code with the lowest priority value to handle the hardware interrupt. As a result, routing of the interrupts can be biased away from processors that are executing high priority tasks or where context switch might be computationally expensive.

20 Claims, 5 Drawing Sheets

HARDWARE INTERRUPT ARBITRATION IN VIRTUALIZED COMPUTER SYSTEMS

BACKGROUND

Hardware interrupts are used in modern computing systems for a variety of purposes including notifying processors of external events and facilitating inter-processor communication. When a hardware interrupt occurs, the processor that is assigned to handle the interrupt performs a context switch between the code it is then executing and the interrupt handling code, known as an interrupt service routine ("ISR"). When the processor finishes executing the ISR, it resumes execution of the code it was executing at the time of the interrupt.

In a virtualized computer system configured with multiple processors, hardware interrupt handling is distributed among the multiple processors. As a way to direct and arbitrate the flow of interrupts in such a system, programmable interrupt controllers are employed. In Intel® x86 based systems, programmable interrupt controllers known as Advanced Programmable Interrupt Controllers (APICs) are commonly used. The APIC architecture is described in IA-32 Intel Architecture Software Developer's Manual, Volume 3A: System Programming Guide, Part 1, Chapter 10, September 2010, the contents of which are incorporated by reference herein.

According to a current interrupt handling technique in virtualized computer systems, hardware interrupts are routed to the least busy processor, and the ISR is executed on that processor. A potential problem with this technique is that the identification of the least busy processor is made on a fairly coarse time scale, and the processor selected for executing the ISR may no longer be the least busy when the hardware interrupt actually occurs and is routed to that processor. In addition, a guest code may be running in the processor identified as the least busy, and the cost of handling an interrupt on such a processor is quite high (about 2000 to 3000 cycles). One solution to this problem would be to identify the least busy processor and processors running in guest context on a finer time scale, but performing such a process is computationally expensive and would add an undesirable amount of overhead if carried out too frequently.

SUMMARY

One or more embodiments of the present invention provide techniques for routing hardware interrupts to one of multiple processors of a virtualized computer system in a manner that accounts for whether or not the processors are running in guest context. In accordance with these techniques, priority values are assigned to tasks running in each of the processors and hardware interrupt arbitration provided by programmable interrupt controllers is employed to bias interrupts away from the processors that are executing high priority tasks such as guest code.

A method of routing hardware interrupts in a virtualized computer system configured with multiple processors, according to an embodiment of the present invention, includes the steps of dynamically updating, for each processor, a priority value associated with code being executed by the processor, and when a hardware interrupt is generated, determining a priority value of the code currently being executed by each processor, and routing the hardware interrupt to the processor executing a code with the lowest priority value to handle the hardware interrupt.

Further embodiments of the present invention include, without limitation, a non-transitory computer-readable storage medium that includes instructions that enable a processing unit to implement one or more aspects of the above method as well as a computer system configured to implement one or more aspects of the above method.

DETAILED DESCRIPTION

Figure 1:
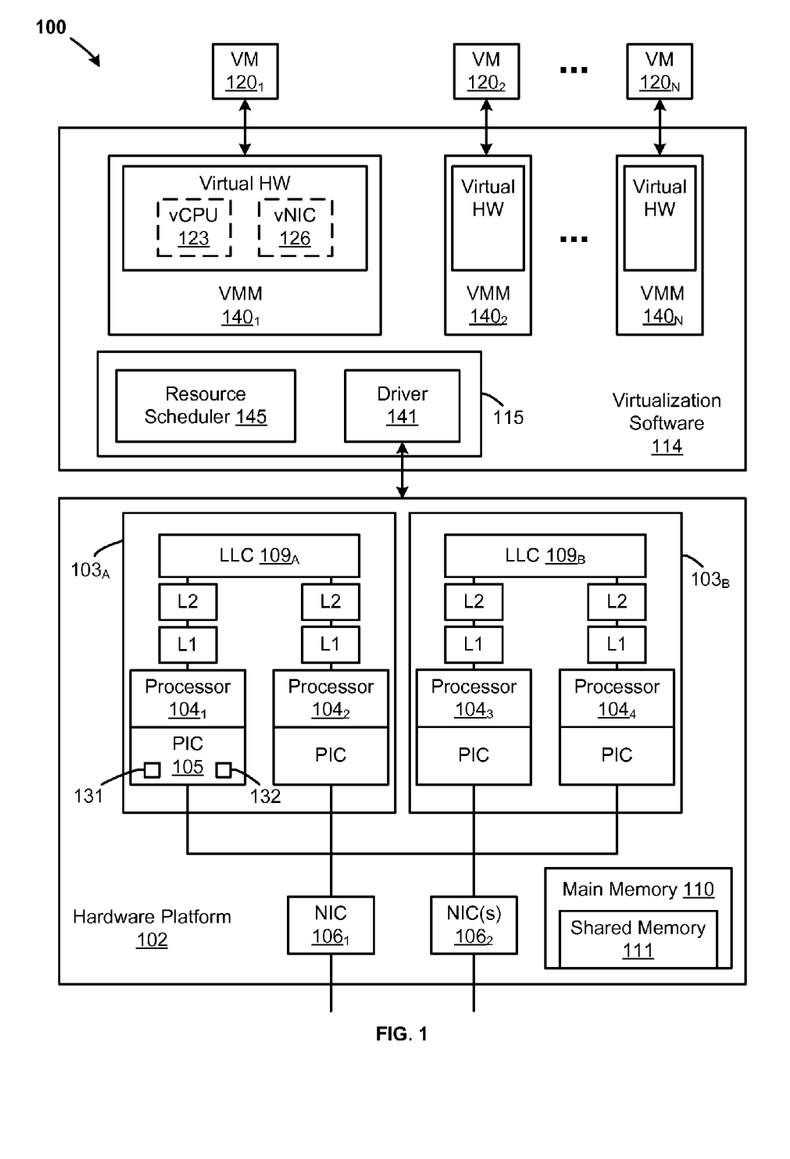
FIG. 1 depicts a block diagram of a virtualized computer system in which one or more embodiments of the present invention may be practiced.

FIG. 1 depicts a block diagram of a virtualized computer system 100 in which one or more embodiments of the present invention may be practiced. Host computer system 100 may be constructed on a desktop, laptop or server grade hardware platform 102 such as an x86 architecture platform. Hardware platform 102 includes one or more physical central processing units (PCPUs), each having a plurality of processors, with several levels of cache, including a last-level cache (LLC). In the embodiment of present invention illustrated herein, two PCPUs are provided, PCPU $103_A$ and PCPU $103_B$. The processors of PCPU $103_A$, processors $104_1$ and $104_2$, each have their own L1 and L2 level caches but share LLC $109_A$. Likewise, the processors of PCPU $103_B$, processors $104_3$ and $104_4$, each have their own L1 and L2 level caches but share LLC $109_B$. The PCPUs are connected to main memory 110 that includes shared memory 111, via a memory interconnect (not shown).

Virtualized computer system 100 further includes other standard hardware components including interfaces to input/output (IO) devices, such as network interface cards (NICs), NIC $106_1$ and $106_2$, that issue hardware interrupts when certain IO events occur, e.g., receipt of a network packet. In virtualized computer system 100, as a way to direct and arbitrate the flow of hardware interrupts to different processors for handling, a programmable interrupt controller (PIC), e.g., advanced programmable interrupt controller provided in x86 based chipsets, is provided per processor. Various registers are also included in each PIC to store values used in performing interrupt handling and arbitration. They include a task priority register (TPR) 131 and a processor priority register (PPR) 132, which are shown in FIG. 1 for PIC 105 that is associated with processor $104_1$. The use of these registers in the arbitration of hardware interrupts by the PICs will be described in further detail below. In addition, depending on the configuration of the PICs, hardware interrupts that are generated may be directed to a particular PIC, or may be broadcast to a group of PICs or all of the PICs.

In virtualized computer system 100, virtualization software 114 is executing on hardware platform 102, as shown conceptually in FIG. 1. Virtualization software 114 includes a plurality of software layers including a kernel 115 that manages the hardware resources through drivers 141, and virtual machine monitors (VMMs) $140_1$-$140_N$ each emulating hardware resources, such as virtual CPU (vCPU) 123 and virtual NIC (vNIC) 126, for a corresponding one of virtual machines (VMs) $120_1$-$120_N$. It should be recognized that the VMM for a given vCPU identifies the processor to which the vCPU is mapped using a shared data structure maintained in shared memory 111 and indexed by vCPU number. For example, when the VMM for vCPU #N is coming into context on processor #P, the VMM sets array[N]=P. Then, all other VMMs that need to find vCPU #N can look up in the array and find the current processor #P that they should target. When the VMM for vCPU #N is leaving context, it sets array[N]=an invalid value. Kernel 115 further includes a resource scheduler 145 for prioritizing and dispatching execution threads to processors 104.

Each VM 120 is an abstraction of a physical computer system, having virtual hardware resources, including a vCPU, provided by a corresponding VMM 140. In addition, each VM 120 includes a guest operating system (OS) that provides guest applications running in the virtual machine an interface to the virtual hardware resources of the virtual machine. The kernel of the guest OS performs various tasks including the assignment of processes, such as the ones associated with the guest applications, to the vCPU. The scheduling of the vCPU for execution using one of processors 104 is managed by resource scheduler 145.

It should be recognized that the various terms, layers and categorizations used to describe the virtualization components in FIG. 1 may be referred to differently without departing from their functionality or the spirit or scope of the invention. One example of virtualization software 114 that may be used is included as a component of VMware's vSphere product, which is commercially available from VMware, Inc. of Palo Alto, Calif. ("VMware"). It should further be recognized that other virtualized computer systems are contemplated, such as hosted virtual machine systems, where virtualization software 114 is implemented in conjunction with an operating system installed on hardware platform 102.

In virtualized computer system 100, a hardware interrupt may be issued by NIC $106_1$, NIC $106_2$, and other hardware devices when certain IO events occur. One example of an IO event is the receipt of a network packet on NIC $106_1$ or NIC $106_2$. Another example of an IO event is the receipt of IO completion signal from an external storage device by a host bus adapter (not shown). According to one or more embodiments of the present invention, when an interrupt is issued in response to such events, PICs of processors 104 carry out an arbitration process to select a processor for handling the interrupt. Upon completion of the arbitration process, the interrupt is routed to the selected processor for handling.

Figures 2A, 2B:
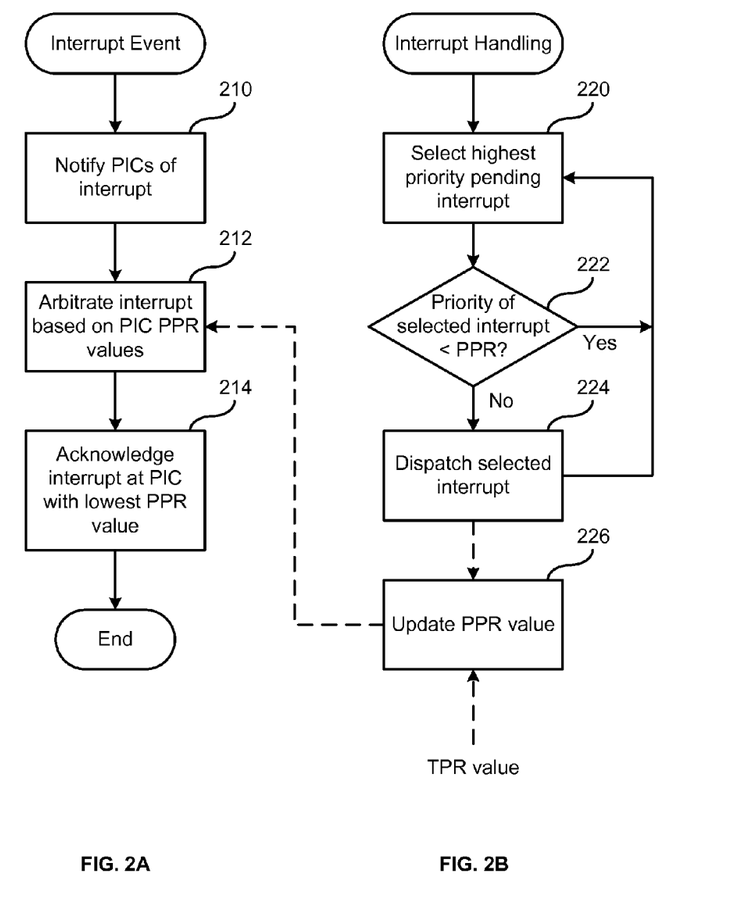
FIG. 2A is a flow diagram that illustrates the steps of an interrupt arbitration process.
FIG. 2B is a flow diagram that illustrates the steps of an interrupt handling process.

FIG. 2A is a flow diagram that illustrates the steps of the interrupt arbitration process. When an interrupt event occurs, PICs of processors 104 are notified about the interrupt at step 210. The notification may be given in any technically feasible way. In the embodiments of the present invention described herein, a message signaled interrupt (MSI) is employed pursuant to which an interrupt pin assertion is emulated in a special message transmitted to the PICs and data associated with the interrupt, such as the interrupt vector, identification of PICs that are targeted by the interrupt, and interrupt type, are stored in shared memory 111. At step 212, each PIC reads the value stored in its PPR register. This value represents the maximum of: (1) the priority value of the thread that is currently executing in the corresponding processor (which is stored in the TPR register); and (2) the priority value of the highest priority interrupt that is queued in the PIC for handling. It should be recognized that the PPR value continually changes, in the embodiments of the present invention described herein, as the queued interrupts are processed by the PIC and as different threads (with different priority values) are being executed in the processor. One process by which the PPR values may change is illustrated in FIG. 2B and will be further described below. The processor that has the lowest PPR value is selected as the processor for handling the interrupt, and at step 214, the PIC associated with the selected processor acknowledges the interrupt and adds it to its queue for handling. If more than one processor has the lowest PPR value, the PICs may implement any technique, such as round-robin or random, to select one processor from the group.

FIG. 2B is a flow diagram that illustrates the steps of an interrupt handling process. The PIC selects the highest priority pending interrupt for handling at step 220 and compares it against the current PPR value at step 222. If the priority value of the selected interrupt is not less than the PPR value, the selected interrupt is dispatched for processing at step 224. Otherwise, the process flow returns to step 220. Step 226 represents the step of updating the PPR value. This step does not directly flow from step 224 but is shown connected to step 224 by a dashed arrow because the PPR value may be updated as a result of interrupts being dispatched at step 224 and completed. Further, threads being executed in the corresponding processor change over time, the TPR value changes over time. The change in the TPR value may also result in an update to the PPR value. Step 226 is also shown connected to step 212 of FIG. 2A by a dashed arrow to signify that the continually updated PPR values of the PICs are used in the arbitration carried out at step 212 of FIG. 2A.

Figure 3:
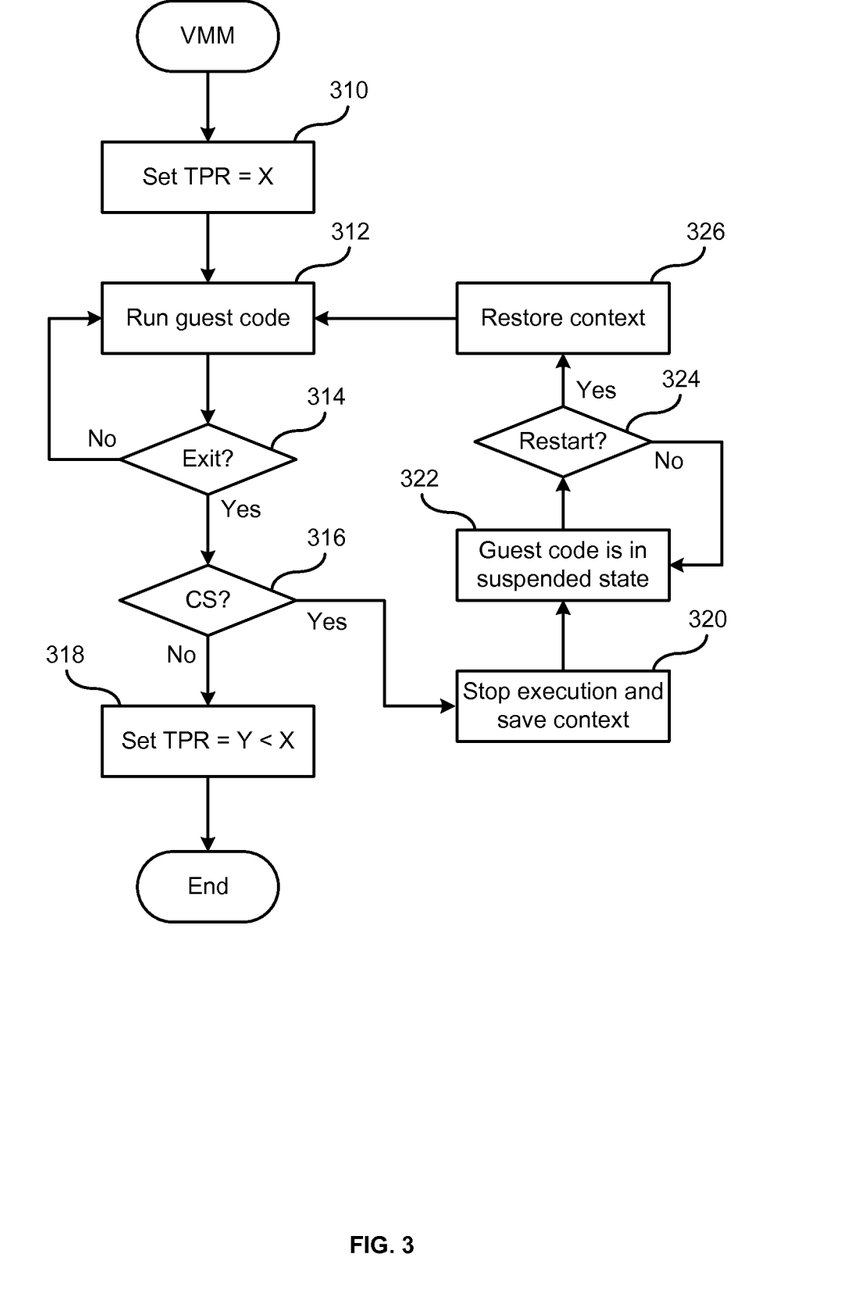
FIG. 3 is a flow diagram that illustrates the method for updating priority values of code executing in a processor.

FIG. 3 is a flow diagram that illustrates the steps carried out by each VMM to update TPR values when guest code of a corresponding VM is executed in one of processors 104. As shown in the flow diagram, VMM sets the priority value stored in the TPR register at step 310 (just prior to guest code execution) and at step 318 (just after guest code execution). At step 310, VMM sets the priority value stored in the TPR register to a value X in accordance with the priority level of the guest code to be executed in step 312. The priority values may be assigned based on several factors. First, the priority value should be assigned so that they will not mask out high priority hardware interrupts, i.e., the maximum assignable value is set to be less than priority values associated with high priority hardware interrupts. Second, the priority values may be assigned in proportion to weights or shares given by resource scheduler 145 according to the methods described in U.S. patent application Ser. No. 12/550,193, filed Aug. 28, 2009 and entitled "Thread Compensation for Microarchitectural Contention", which is incorporated by reference herein. Third, some guest code, depending on where it is in the software stack, undergoes slow exits, i.e., context switch from such process is more costly. As a result, such guest code is given a higher priority value than otherwise. At step 312, the guest code is executed in the processor as scheduled by resource scheduler 145 and continues to run so long as the guest code does not encounter an exit event at step 314. The exit event may be caused by a context switch (CS) as determined at step 316 (e.g., when resource scheduler 145 schedules in another thread to be executed in the same processor), in which case, the execution of the guest code is stopped and associated context saved at step 320. The saved context includes the TPR value of the stopped guest code. Step 322 represents the guest code in the suspended state. The guest code remains in the suspended state until resource scheduler 145 according to the schedule set therein allows the executing state of the guest code to be swapped back into the processor as determined at step 324. Then, the context of the guest code, including its TPR value, is restored at step 326 and the guest code continues execution in the processor at step 312. At step 318, the VMM sets the priority value stored in the TPR register to a value Y, which may be a zero value or some other low value, in all cases less than X. The difference in the X and Y values set by the VMM in the TPR registers ensures that the routing of interrupts that are based on TPR values as illustrated in FIGS. 2A and 2B will be directed to processors that are not running guest code and, if all processors are running guest code, to processors that are running lower priority guest codes.

In some embodiments, VMM sets just two priority values in the TPR register without regard to the importance of the guest code. If guest code is being executed, VMM sets the priority value to the higher value. If guest code is not being executed, VMM sets the priority value to the lower value. In other embodiments, finer gradations of priority values may be implemented depending on information from the resource scheduler, such as: (1) time left in the time slice allocated to the guest code by the resource scheduler, whether the vCPU running the guest code is holding a resource that is depended upon by another vCPU, the quality of service or other service guarantees associated with the guest, and so on. The priority value may also be modified depending on the progress of execution of the guest code in the VMM.

Figure 4:
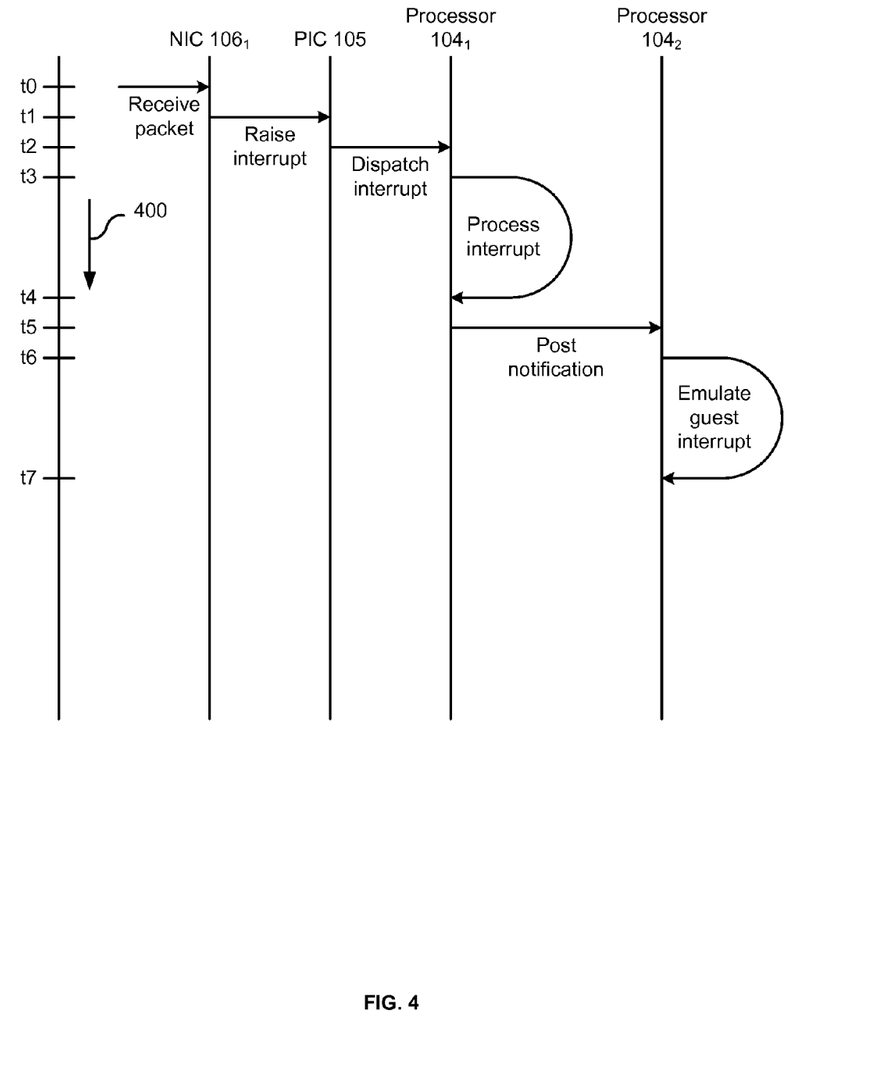
FIG. 4 is an interaction diagram that illustrates the process of handling interrupts according to one or more embodiments of the present invention.

FIG. 4 is an interaction diagram that illustrates the process of handling interrupts according to one or more embodiments of the present invention. A time scale that increases in the direction of arrow 400 is shown to the left of the interaction diagram. The interrupt handling example given here is in response to a network packet received at NIC $106_1$. Upon receiving the network packet at NIC $106_1$ at t0, NIC $106_1$ raises an interrupt for arbitration by the PICs of processors 104 at t1. It should be recognized that NIC $106_1$ also examines the contents of the received packet and identifies the vNIC associated with the received packet. Then, assuming that processor $104_1$ was selected pursuant to the arbitration process explained above in conjunction with FIG. 2A, PIC 105 dispatches the interrupt for handling by processor $104_1$ at t2. At t3, processor $104_1$ executes the ISR associated with the interrupt. Upon completion of the ISR at t4, processor $104_1$ posts a notification of the completion of the ISR to the VMM associated with the identified vNIC at t5. An inter-processor interrupt directed at the processor (e.g., processor $104_2$) running the VMM code is also issued at this time. A guest interrupt is then emulated at t6 by the VMM in this processor. The completion of the emulated guest interrupt occurs at t7.

In the embodiments of the present invention, interrupts are routed to processors 104 that are not executing any code and are thus idle or, if all processors 104 are executing code, to processors 104 that are not executing high priority code, such as guest code. As a result of such preferential routing, if a network packet that contains data for a virtual machine that currently has high-priority threads being executed in a processor (e.g., processor $104_1$) is received at t0, the interrupt raised by NIC $106_1$ is likely handled by another processor (e.g., processor $104_2$) so as to allow the VM to have its high-priority threads executed up until t6. By contrast, under conventional interrupt handling techniques, the interrupt handling may have been assigned to processor $104_2$. This would have caused processor $104_2$ to undergo an expensive context switch earlier than necessary. That is, the context switch would have occurred at t3, which is earlier than t6.

Figure 5:
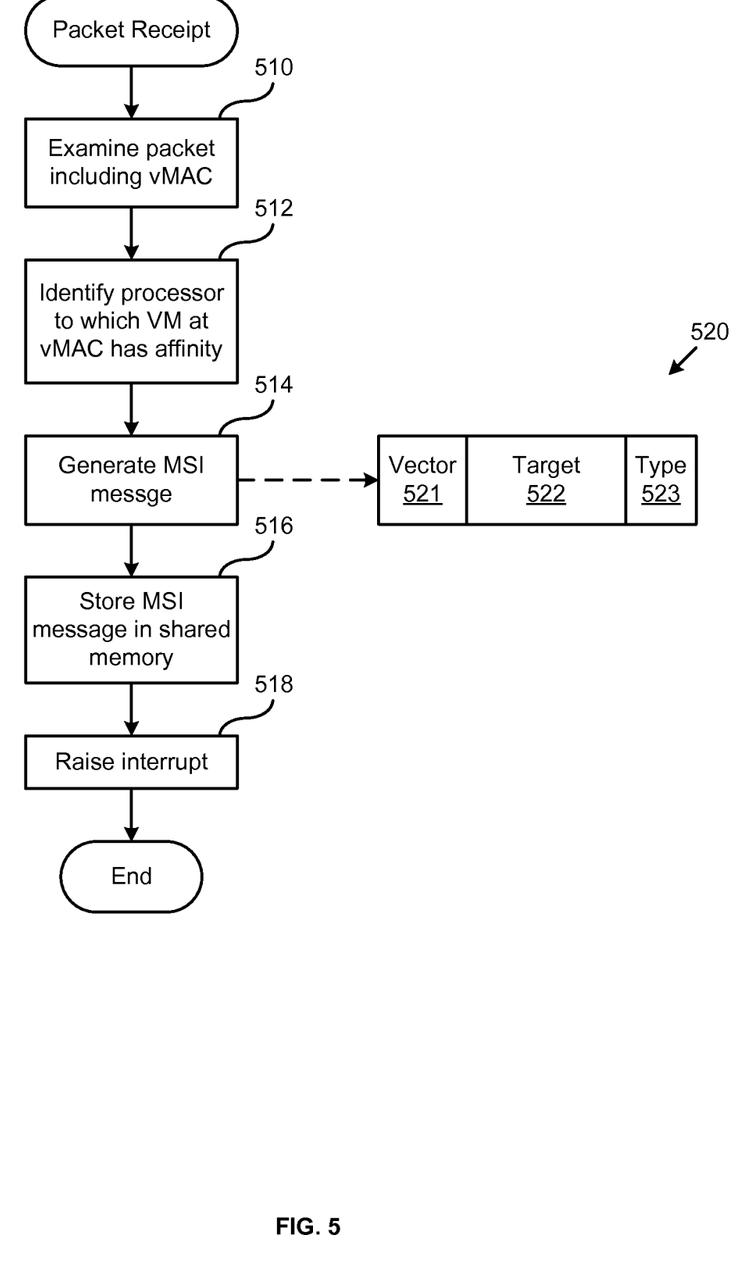
FIG. 5 is a flow diagram that illustrates the steps of a method for arbitrating a message signaled interrupt among a target group of processors.

FIG. 5 is a flow diagram that illustrates the steps of a method for arbitrating a message signaled interrupt or other device interrupts among a target group of processors. The target group of processors includes those processors that share the same LLC as the processor that will be handling the emulated guest interrupt (e.g., processor $104_2$ in the example of FIG. 4). When an interrupt is issued in response to a receipt of a network packet, the virtual Media Access Control (MAC) address of the network packet is examined to determine the virtual machine and the processor that will be handling the emulated guest interrupt. When an interrupt is issued in response to an IO completion message from an external storage device, the IO completion message is examined to determine the virtual machine and the processor that will be handling the emulated guest interrupt. The particular method being described in FIG. 5 is carried out in response to a receipt of a network packet.

At step 510, upon receipt of the network packet, the destination address of the network packet is examined to determine the virtual MAC address of the virtual machine. Then, at step 512, the processor to which the target VM has affinity is identified according to various techniques known in the art. In one embodiment, the processor identified at step 512 is the processor corresponding to the vCPU that is indicated in an interrupt hint. In another embodiment, the processor identified at step 512 is the processor corresponding to the vCPU that is emulated by the VMM of the target VM. An MSI data 520 for a message signaled interrupt (MSI) is generated at step 514 and stored in shared memory 111 at step 516. As shown in FIG. 5, MSI data 520 indicates an interrupt vector 521, an interrupt target 522, and an interrupt type 523. Interrupt vector 521 is used as an index into an interrupt descriptor table to find an instruction pointer to an ISR that is to be executed. Interrupt target 522 identifies a group of PICs that are targeted for handling the interrupt. In the embodiment where APICs are employed, the APIC has a cluster logic mode that allows the software to set the upper half of the ID field as the cluster number for a cluster of processors, e.g., cluster of processors sharing the LLC with the processor identified in step 512. Interrupt type 523 specifies whether this is an arbitrated priority interrupt or not, whether the interrupt is physical or logical, the delivery mode, and other parameters. In the embodiments of the present invention, interrupt type 523 specifies that the interrupts are of: (1) arbitrated priority, physical mode, and broadcast types; or (2) arbitrated priority, logical mode, and clustered types (where a cluster is set up to match processors that share an LLC). Then, at step 518, the NIC that received the network packet raises an interrupt for processing by the PICs in accordance with MSI data 520 stored in shared memory 111.

In embodiments of the present invention where MSI is not supported by hardware platform 102 or in cases where the software chooses not to use MSI, IO-PICs, such as IO-APICs, may be used to receive interrupts from IO devices and direct them to PICs of processors 104. In addition, IO-PICs may be programmed to target a group of PICs for handling an interrupt to ensure that the interrupt is handled by a processor that is in the same group of processors that share an LLC as the processor that will be handling the emulated guest interrupt.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of routing hardware interrupts to one of processors that are programmed to execute instances of virtual machines and guest code running in the virtual machines in accordance with priority values for handling interrupts that are set in the processors, said method comprising:
at each processor that is programmed to run guest code, setting a priority value for handling interrupts to a first value prior to execution of guest code and to a second value after execution of the guest code, the first value being higher than the second value,
wherein, when a hardware interrupt is generated, the hardware interrupt is routed to the processor having the lowest set priority value, for handling.

2. The method of claim 1, wherein, if at least two processors have the lowest set priority value, one of said at least two processors is selected to handle the hardware interrupt.

3. The method of claim 2, wherein the selection is done according to a round robin technique.

4. The method of claim 2, wherein the selection is done randomly.

5. The method of claim 1, wherein each processor has an associated programmable interrupt controller (PIC) and the PICs of the processors arbitrate to identify the processor that has the lowest set priority value.

6. The method of claim 5, wherein each PIC maintains a task priority register (TPR) in which the priority value of code currently executing in the processor associated with the PIC is stored.

7. The method of claim 6, wherein the codes executing in the processors have a maximum assignable priority value that is less than priority values associated with high priority hardware interrupts.

8. The method of claim 1, wherein the same first value is used for all processors that are programmed to run guest code.

9. The method of claim 1, wherein variable first values are used for the processors that are programmed to run guest code.

10. The method of claim 9, wherein the first value to which the priority value is set varies based on an importance value assigned to the guest code by a resource scheduler.

11. A method of routing hardware interrupts to one of processors that are programmed to execute instances of virtual machines and guest code running in the virtual machines in accordance with priority values for handling interrupts that are set in the processors, said method comprising:
at each processor, that is programmed to run guest code, setting a priority value for handling interrupts to a first value prior to execution of guest code and to a second value after execution of the guest code, the first value being higher than the second value; and
when a hardware interrupt is generated, identifying a set of the processors as candidates for handling the hardware interrupt,
wherein, the hardware interrupt is routed to the processor in the set having the lowest set priority value, for handling.

12. The method of claim 11, wherein the processors in the set share a last level cache.

13. The method of claim 12, wherein the hardware interrupt is generated in response to a receipt of a packet, and the set of processors includes a processor that is scheduled to execute guest code of a virtual machine associated with a destination address of the packet.

14. The method of claim 13, wherein the hardware interrupt is generated pursuant to a message signaled interrupt.

15. The method of claim 14, wherein a message associated with the message signaled interrupt includes an identification of the processors in the set.

16. The method of claim 11, wherein the hardware interrupt is generated by an input-output programmable interrupt controller (IO-PIC) and the IO-PIC is configured to identify the processors in the set.

17. The method of claim 16, wherein the processors in the set share a last level cache.

18. A computer system comprising:
processors that are programmed to execute instances of virtual machines and guest code running in the virtual machines; and
programmable interrupt controllers (PICs), each of which is associated with a different one of the processors,
wherein each processor is programmed to set a priority value for handling interrupts to a first value prior to execution of the guest code and to a second value after execution of the guest code, the first value being higher than the second value, and
wherein routing of hardware interrupts are arbitrated by the PICs based on the priority values.

19. The computer system of claim 18, wherein each of the hardware interrupts is routed to a processor having the lowest set priority value.

20. The computer system of claim 18, wherein each processor is programmed to set a priority value for handling interrupts prior to execution of the guest code in accordance an importance value assigned to the guest code by a resource scheduler.

\* \* \* \* \*